UNITED STATES PATENT OFFICE.

ARTHUR KOETZLE, OF NEW YORK, N. Y., ASSIGNOR TO ROHM & HAAS COMPANY, A CORPORATION OF DELAWARE.

TANNING MATERIAL AND PROCESS OF PRODUCING THE SAME.

1,344,952.   Specification of Letters Patent.   Patented June 29, 1920.

No Drawing.   Application filed June 6, 1919. Serial No. 302,185.

*To all whom it may concern:*

Be it known that I, ARTHUR KOETZLE, a citizen of Germany, and a resident of the city of New York, county of New York, and State of New York, have invented certain new and useful Improvements in Tanning Materials and Processes of Producing the Same, of which the following is a specification.

The general object of my invention is the production of a material by the use of which skins, hides, etc., may be tanned and leather obtained.

My invention also relates to the methods or processes by which such tanning materials may be produced.

I have discovered that new and useful materials or products, suitable for use in processes of tanning leather, and soluble in water, can be obtained by condensing, with formaldehyde, the sulfonic acids of 1-monochlornaphthalene and 1.4-dichlornaphthalene. Instead of using these substantially pure chlornaphthalene sulfonic-acids, the crude chlorination products of naphthalene (chlornaphthalenes) can also be sulfonated and condensed with formaldehyde.

My invention may be carried out in a number of ways, two of which are specifically set forth below, but it is to be understood that my invention is not to be construed as limited to these exact steps, nor to the exact proportions given, as the same may be suitably varied without substantially affecting the invention.

In producing my improved tanning material, I add to, or introduce in, substantially 400 parts of concentrated sulfuric acid, substantially 100 parts of alpha-chlornaphthalene. I then agitate the mixture for a period of about twenty (20) hours, maintaining the temperature of the same at about 40° C. I then gradually add, when the sulfonation is completed or finished, substantially 30 parts of 40% formaldehyde, and continue to agitate or stir the mixture for several hours until the odor of formaldehyde has practically disappeared. I then dilute the mixture or product, with substantially 400 parts of water and neutralize the acid content thereof with a suitable solution of caustic soda.

The solution so produced is an aqueous solution of a condensation product of chlorinated naphthalene sulfonic acid with formaldehyde, and can be employed directly as a tanning material. This new product is amorphous, easily soluble in water, adapted to precipitate glue and gelatin in acid solutions, and to produce, when employed as a tanning material, a white, soft and strong leather. It may be produced in the form of a colorless solution or in the form of powder, flakes, granules or paste, depending upon the amount of water or moisture included, and of substantially white color. The granules may, however, be colorless.

The above method or process can be varied, however, in the following manner:

I treat naphthalene with chlorin at a temperature of from 80° C. to 100° C. to obtain dichlornaphthalene. I then introduce into 400 parts of fuming sulfuric acid, containing substantially 20% sulfur trioxid ($SO_3$), substantially 100 parts of the dichlornapthalene obtained as above described and then heat the mixture for a period of substantially two hours at a temperature of from 80° C. to 100° C. until the resulting product is soluble in water. I then cool this material down to a temperature of about 40° C. and while stirring, or otherwise agitating same, substantially 20 parts of 40% formaldehyde. After the odor of formaldehyde has substantially disappeared, I further dilute the material by adding a suitable quantity of water (say about 400 parts of water), and neutralize the acid content of the material with caustic soda. This material is substantially the same kind of material as that which results from the process first above described, since it is an aqueous neutral solution of a condensation product of chlorinated naphthalenesulfonic acid with formaldehyde, and may also be used directly as a tanning agent.

While I have above described the manner in which my tanning material may be produced, these descriptions are intended as exemplifying, rather than limiting my invention, and it is to be understood that the materials, their proportions, the order in which the steps are enumerated, and the period of treatment, may be suitably varied, without departing from the spirit and scope of my invention.

Having thus described my invention, what I claim and desire to protect by Letters Patent of the United States is:

1. A material for tanning purposes, comprising a condensation product of a chlorinated naphthalenesulfonic acid with formaldehyde which product is amorphous, soluble in water and adapted to produce a light colored and strong leather.

2. A material for tanning purposes, comprising a condensation product of alpha-chlornaphthalenesulfonic acid with formaldehyde, which product is amorphous, soluble in water and adapted to produce a light colored and strong leather.

3. A material for tanning purposes, comprising the condensation product of 1,4-dichlornaphthalenesulfonic acid with formaldehyde, which product is amorphous, soluble in water and adapted to produce a light colored and strong leather.

4. A material for tanning purposes, comprising the condensation products of the sulfonic acids of monochlornaphthalene and dichlornaphthalene with formaldehyde, which product is amorphous, soluble in water and adapted to produce a light colored and strong leather.

5. The process of producing a material for use in tanning and the like, which consists in sulfonating a chlorinated naphthalene and condensing the sulfonic acid with formaldehyde.

6. The process of producing a material for use in tanning, which consists in condensing a compound containing alpha-chlornaphthalenesulfonic acid nucleus with formaldehyde.

7. The process of producing a material for use in tanning, which consists in condensing 1.4-dichlornaphthalenesulfonic acid with formaldehyde.

8. The process of producing a material for use in tanning and the like, which consists in sulfonating a mixture of chlornaphthalenes including a dichlornaphthalene and condensing the sulfonic product with formaldehyde.

9. The process of producing a material for use in tanning and the like which consists in adding 400 parts of concentrated sulfuric acid to 100 parts of a chlornaphthalene, agitating the mixture for substantially 20 hours at a temperature of about 40° C., adding substantially 30 parts of 40% formaldehyde and stirring until the resulting product is soluble in water, then diluting the material with substantially 400 parts of water, and neutralizing the acid content thereof with caustic soda.

10. The process of producing a material for use in tanning and the like, which consists in treating naphthalene with chlorin to produce dichlornaphthalene, mixing such dichlornaphthalene with fuming sulfuric acid, heating the mixture until the product is soluble in water, cooling the mixture and then adding formaldehyde, diluting the material with water, and neutralizing the acid content of the product with caustic soda.

In witness whereof, I have hereunto set my hand this 31st day of May, 1919.

ARTHUR KOETZLE.